(12) United States Patent
Steinmetz et al.

(10) Patent No.: US 9,187,675 B2
(45) Date of Patent: Nov. 17, 2015

(54) METHOD FOR PRODUCING A COLOUR AND/OR EFFECT-PRODUCING MULTI-LAYERED COATING

(75) Inventors: Bernhard Steinmetz, Rütschenhausen (DE); Peggy Jankowski, Güntersleben (DE)

(73) Assignee: BASF Coatings GmbH, Munster (DE)

( * ) Notice: Subject to any disclaimer, the term of this patent is extended or adjusted under 35 U.S.C. 154(b) by 87 days.

(21) Appl. No.: 14/001,409

(22) PCT Filed: Feb. 24, 2012

(86) PCT No.: PCT/EP2012/053175
§ 371 (c)(1),
(2), (4) Date: Nov. 5, 2013

(87) PCT Pub. No.: WO2012/113914
PCT Pub. Date: Aug. 30, 2012

(65) Prior Publication Data
US 2015/0044478 A1 Feb. 12, 2015

Related U.S. Application Data

(60) Provisional application No. 61/446,064, filed on Feb. 24, 2011.

(30) Foreign Application Priority Data

Feb. 24, 2011 (EP) ..................................... 11155808

(51) Int. Cl.
*C09D 175/16* (2006.01)
*B05D 3/00* (2006.01)
(Continued)

(52) U.S. Cl.
CPC ................ *C09D 175/16* (2013.01); *B05D 1/36* (2013.01); *B05D 3/007* (2013.01); *B05D 3/06* (2013.01); *B05D 7/534* (2013.01); *C08G 18/10* (2013.01); *C08G 18/3212* (2013.01); *C08G 18/68* (2013.01); *C08G 18/758* (2013.01);
(Continued)

(58) Field of Classification Search
CPC ........ C09D 175/16; B05D 1/36; B05D 3/007; B05D 3/06; C08K 5/205
USPC .................... 428/423.1; 427/385.5, 514, 493; 524/199, 538
See application file for complete search history.

(56) References Cited

U.S. PATENT DOCUMENTS 6,001,915 A 12/1999 Schwarte et al.
6,632,915 B1 10/2003 Schwarte et al.
(Continued)

FOREIGN PATENT DOCUMENTS

DE 19930665 A1 1/2001
DE 19948004 A1 7/2001
(Continued)

OTHER PUBLICATIONS

International Search Report for International Application No. PCT/EP2012/053175 mailed Jun. 4, 2012, 5 pages.
(Continued)

*Primary Examiner* — Thao T Tran
(74) *Attorney, Agent, or Firm* — Servilla Whitney LLC

(57) ABSTRACT

A method for producing a multicoat color and/or effect paint system comprising a pigmented aqueous basecoat material comprising at least one polyurethane resin (A) as binder, at least one color and/or effect pigment, and 0.05% to 10% by weight, based on the total amount of the pigmented aqueous basecoat material, of an associative thickener (B) different from the polyurethane resin (A), the associative thickener (B) being composed of at least one compound of the following formula (I):

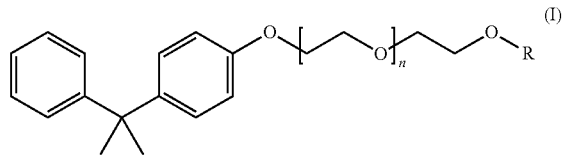

with n=0 to 50,
where R=

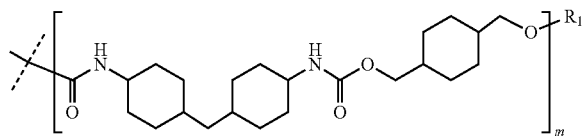

with m=0 to 10,
where $R_1$=H or $R_2$,
where $R_2$=

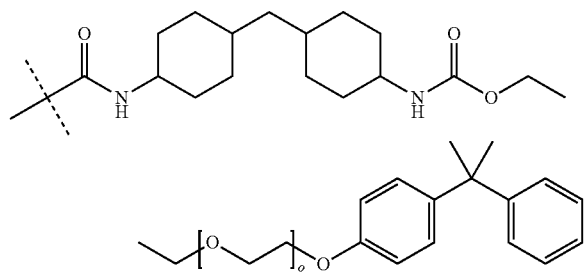

with o=0 to 50,
with the proviso that for not more than 50% by weight of the compounds of the formula (I), m=0 and $R_1$=H.

15 Claims, No Drawings

(51) Int. Cl.

| | |
|---|---|
| B05D 3/06 | (2006.01) |
| B05D 1/36 | (2006.01) |
| B05D 7/00 | (2006.01) |
| C09D 151/08 | (2006.01) |
| C09D 175/04 | (2006.01) |
| C09D 5/02 | (2006.01) |
| C09D 7/00 | (2006.01) |
| C08G 18/68 | (2006.01) |
| C08G 18/75 | (2006.01) |
| C08G 18/10 | (2006.01) |
| C09D 161/28 | (2006.01) |
| C08G 18/32 | (2006.01) |
| C08K 5/3492 | (2006.01) |
| C08L 61/28 | (2006.01) |
| C08K 5/205 | (2006.01) |

(52) U.S. Cl.
CPC ............... *C09D 5/02* (2013.01); *C09D 5/024* (2013.01); *C09D 7/002* (2013.01); *C09D 151/08* (2013.01); *C09D 161/28* (2013.01); *C09D 175/04* (2013.01); *B05D 2503/00* (2013.01); *B05D 2520/00* (2013.01); *C08K 5/205* (2013.01); *C08K 5/34922* (2013.01); *C08L 61/28* (2013.01); *Y10T 428/31551* (2015.04)

(56) References Cited

U.S. PATENT DOCUMENTS

2008/0108743 A1* 5/2008 Tomizaki et al. ............. 524/523
2008/0199625 A1* 8/2008 Niwa .......................... 427/407.1
2009/0270548 A1* 10/2009 Steinmetz et al. ............ 524/504
2010/0255328 A1* 10/2010 Tomizaki et al. ............. 428/483

FOREIGN PATENT DOCUMENTS

| DE | 10043405 C1 | 6/2002 |
| DE | 4437535 | 4/2015 |
| EP | 0228003 A1 | 7/1987 |
| EP | 0521928 B1 | 8/1994 |
| EP | 0634431 A1 | 1/1995 |
| WO | WO9215405 A1 | 9/1992 |

OTHER PUBLICATIONS

English Translation of International Search Report for International Application No. PCT/EP2012/053175 mailed Jun. 4, 2012, 4 pages.
Written Opinion for International Application No. PCT/EP2012/053175 mailed Jun. 4, 2012, 6 pages.
English Translation of International Preliminary Report on Patentability for International Application No. PCT/EP2012/053175 issued Aug. 27, 2013, 6 pages.
English Translation of Written Opinion for International Application No. PCT/EP2012/053175 mailed Jun. 4, 2012, 5 pages.

* cited by examiner

US 9,187,675 B2

METHOD FOR PRODUCING A COLOUR AND/OR EFFECT-PRODUCING MULTI-LAYERED COATING

CROSS REFERENCE TO RELATED APPLICATIONS

This application is a National Phase Application of Patent Application PCT/EP2012/053175 filed on 24 Feb. 2012, which claims priority to EP 11155808.6 filed 24 Feb. 2011 and U.S. 61/446,064 filed 24 Feb. 2011, of which all aforementioned applications are incorporated by reference herein in their entirety.

FIELD OF THE INVENTION

The present invention relates to a method for producing a multicoat color and/or effect paint system by
(1) applying to a substrate a pigmented aqueous basecoat material comprising a polyurethane resin as binder and also a polyurethane-based associative thickener,
(2) forming a polymer film from the basecoat material applied in stage (1),
(3) applying a clearcoat material to the resultant basecoat film, and then
(4) curing the basecoat film together with the clearcoat material applied in stage (3).

The present invention also relates to a pigmented aqueous basecoat material comprising a polyurethane resin as binder and also a polyurethane-based associative thickener, this material being suitable for producing multicoat color and/or effect paint systems. The present invention relates, furthermore, to a multicoat paint system produced in accordance with the method, using the basecoat material, on a substrate.

BACKGROUND OF THE INVENTION

The method described above is known (compare, for example, German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) and is widely used, for example, not only for OEM (original) finishing but also for refinish on automobile bodies.

The so-called basecoat/clearcoat method in question is used in a wet-on-wet process to produce multicoat color and/or effect paint systems, which particularly in respect of running are in need of improvement.

Pigmented aqueous basecoat materials comprising polyurethane resins as binders are known. They can be applied to different substrates and then cured physically, thermally and/or with actinic radiation to produce coatings. They preferably comprise color and/or effect pigments and are used for producing color and/or effect coatings, examples being basecoats as part of multicoat paint systems or solid-color topcoats for—for example—automobile bodies or parts thereof. The use of aqueous coating materials is preferred from environmental standpoints to the use of coating materials which are based on organic solvents.

In the finishing of automobile bodies there is a very wide variety of application defects that may occur. One frequent defect is that of running. By running are meant the sagging of coating materials, which, though they have been applied, have not yet fully dried or cured, on vertical or inclined surfaces. This sagging generally results in an unattractive and uneven appearance in the coating that results after curing. Where this run phenomenon occurs across a relatively large area, is also called "curtaining". In general a distinction is made between running at edges and angles, and the extensive sagging of coatings on surfaces, which is also called "slipping". The reason for the formation of running may lie in an incorrect composition or in incorrect application of the coating material.

The quality of a coating material and therefore, consequently, of a coating produced using this coating material in terms of its stability with respect to running (run stability) is frequently determined on the basis of the run limit. The run limit is the term, generally, for that wet film thickness of the applied coating material above which the first runs occur following spray application of said material to a vertical, perforated metal panel.

In the art, these run phenomena pose a grave problem, since, in the context of the industrial coating of three-dimensional substrates of complex shape, and especially in the context of automotive OEM finishing, they lower operational reliability and increase the reject rate. For instance, in the finishing of automobile bodies, there is a risk of building excessively thick coats at sharp edges of the bodies on electrostatic spray application (ESTA). If the thickness of these coats exceeds the run limit of the coating material in question, the disruptive run phenomena come about in the course of processing, more particularly during drying and thermal curing.

In the past there have been many attempts to counter this problem.

For example, in the production of multicoat color and/or effect paint systems, the automakers frequently reduce the film thickness of the basecoat, but this may have a strongly adverse impact on key performance properties such as, for example, the color intensity and color depth of the multicoat paint system, and hence on the optical quality. On the part of the paint manufacturers, attempts are made to resolve the problems by adding substantial amounts of rheological assistants, rheology control additives and/or thickeners to the coating materials, particularly to the basecoat materials. Examples are the inorganic phyllosilicates such as aluminum magnesium silicates, sodium magnesium and sodium magnesium fluorine lithium phyllosilicates of the montmorillonite type, and the silicas such as Aerosils. Thickeners also include special synthetic polymers having ionic and/or associative groups such as polyacrylamides and polymethacrylamides (poly(meth)acrylamides), poly(meth)-acrylic acids, polyvinyl alcohols, polyvinylpyrrolidones, or else styrene-maleic anhydride copolymers and derivatives thereof. Likewise used are certain modified natural materials such as hydroxyethylcellulose, carboxymethylcellulose, hydroxypropylmethylcellulose, hydroxypropylcellulose or ethylhydroxyethylcellulose. A further group of thickeners used in a very wide variety of coating materials, basecoat materials being an example, are the associative thickeners. Associative thickeners are water-soluble polymers which have strongly hydrophobic groups at the chain ends or in side chains and/or whose hydrophilic chains contain hydrophobic blocks or bundles in the interior. As a consequence, these polymers possess a surfactant character and are capable of forming micelles. They are employed as thickening additives in the production of a very wide variety of aqueous systems, as for example in auto paints or industrial coatings in general, architectural paints, printing inks, and adhesive-bonding applications. Similarly to the case with surfactants, the hydrophilic regions remain in the aqueous phase, while the hydrophobic regions become housed in the particles of polymer dispersions, are adsorbed on the surface of other solid particles such as pigments and/or fillers, and/or form micelles in the aqueous phase. Besides conventional hydrogel formation in the aqueous phase, therefore, the described solid particles of a disperse system are hence also incorporated into the structuring, resulting ultimately in a homogenization of the dispersion and in a thickening effect which frequently is substantially more effective than with the aforementioned thickeners. Numerous associative thickeners are known, and some of them have distinct structural differences. Examples are the hydrophobically modified, alkalinically activated polyacrylates, the hydrophobically modified cellulose ethers, the hydrophobically modified polyacrylamides, the hydrophobically modified polyethers, and the polyurethane-based associative thickeners. The latter are composed, for example, of hydrophilic polyether segments which are capped and/or modified with at least two hydrophobic blocks on the chain ends, on the side chains and/or inside the chain. The individual hydrophilic polyether segments and hydrophobic blocks are linked primarily via urethane bonds.

Even the use of the thickeners referred to above frequently still does not lead to the desired results in terms of run stability. Hence, for example, it is a continual concern on the part of paint manufacturers to find new possibilities for producing multicoat color and/or effect paint systems whose basecoat films exhibit a high run stability. In this way, the intention, by means of high basecoat film thicknesses, for example, is to achieve outstanding color intensity and color depth in the multicoat paint system, together with a very uniform appearance. From environmental considerations, these coatings, more particularly the basecoats, are to be based on aqueous coating materials.

The problem addressed by the present invention, accordingly, was to provide a method of the type described at the outset by which multicoat color and/or effect paint systems are obtainable which even after application of a pigmented aqueous basecoat material at high film thicknesses exhibit very little running. The run stability, therefore, ought to be outstanding, and ought, furthermore, to be improved by comparison with the prior art. In this way, it ought to be possible to produce multicoat color and/or effect paint systems, especially those on automobile bodies or parts thereof, which as well as high color intensity and color depth exhibit a very uniform surface. Accordingly, therefore, the method ought to be able to be used in particular in the sector of the automobile industry, where exacting requirements are imposed on the optical profile.

SUMMARY OF THE INVENTION

In accordance with the invention it has been possible to solve the problems by means of a new method for producing a multicoat color and/or effect paint system by (1) applying to a substrate a pigmented aqueous basecoat material comprising at least one polyurethane resin (A) as binder and at least one color and/or effect pigment,
(2) forming a polymer film from the basecoat material applied in stage (1),
(3) applying a clearcoat material to the resultant basecoat film, and then
(4) curing the basecoat film together with the clearcoat material applied in stage (3), where the method is characterized in that the pigmented aqueous basecoat material applied in stage (1) comprises 0.05% to 10% by weight, based on the total amount of the pigmented aqueous basecoat material, of an associative thickener (B) different from the polyurethane resin (A), the associative thickener (B) being composed of at least one compound of the following formula (I):

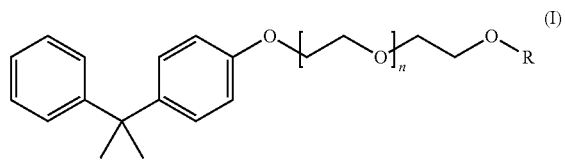

with n=0 to 50,
where R=

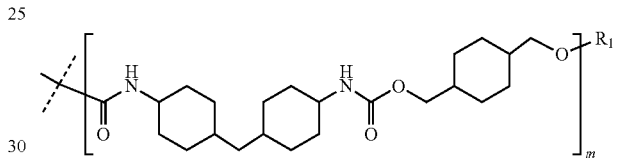

with m=0 to 10,
where $R_1$=H or $R_2$,
where $R_2$=

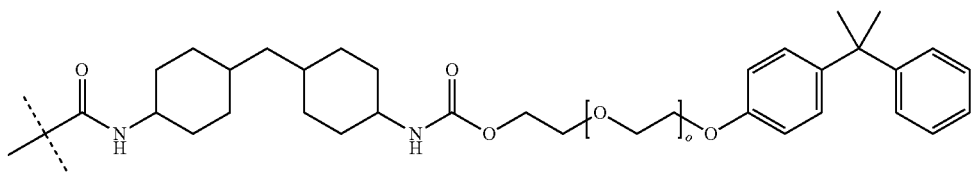

with o=0 to 50,
with the proviso that for not more than 50% by weight of the compounds of the formula (I), m=0 and $R_1$=H.

The new method is referred to below as method of the invention. Further, preferred embodiments of the method of the invention will become apparent from the description which follows.

The present invention further provides a pigmented aqueous basecoat material comprising at least one polyurethane resin (A) as binder, at least one color and/or effect pigment, and also 0.05% to 10% by weight, based on the total amount of the pigmented aqueous basecoat material, of an associative thickener (B).

Likewise provided with the present invention is a multicoat color and/or effect paint system produced in accordance with the method of the invention.

By virtue of the method of the invention and the associated combination of a polyurethane resin (A) with the specific associative thickener (B) in the pigmented aqueous basecoat material used in stage (1) of the method of the invention, multicoat color and/or effect paint systems are obtained that have enormously improved run stability by comparison with the prior art. A particular surprise was that the multicoat paint systems produced in accordance with the invention exhibited substantially better run properties than those multicoat paint systems produced using pigmented aqueous basecoat materials comprising conventionally employed polyurethane-based associative thickeners. The pigmented aqueous basecoat material to be applied in stage (1) can be applied in comparatively high coat thicknesses without the formation of runs. As a result, multicoat color and/or effect paint systems can be produced which exhibit not only high color intensity and color depth but also a very uniform appearance. The multicoat paint systems therefore have a high optical quality. The method can be employed with particular advantage in the sector of the automobile industry, where exacting requirements are imposed on the optical profile.

DETAILED DESCRIPTION OF AN EMBODIMENT OF THE INVENTION

The pigmented aqueous basecoat material for use in the method of the invention is curable physically, thermally and/or both thermally and with actinic radiation. To this end it comprises at least one polyurethane resin (A), described later on below, which is curable physically, thermally and/or both thermally and with actinic radiation. More particularly the pigmented aqueous basecoat material is curable thermally and/or both thermally and with actinic radiation. The pigmented aqueous basecoat material may be self-crosslinking and/or externally crosslinking.

In the context of the present invention, the term "physical curing" denotes the formation of a film by loss of solvent from polymer solutions or polymer dispersions. Normally no crosslinking agents are needed for such curing.

In the context of the present invention the term "thermal curing" denotes the heat-initiated crosslinking of a coating film, for which, in the parent coating material, either a separate crosslinking agent is employed alongside the binder, or else self-crosslinking binders are employed. The crosslinking agent comprises reactive functional groups which are complementary to the reactive functional groups present in the binders. This is typically referred to by those in the art as external crosslinking. The binder employed in this context is termed an externally crosslinking binder. Where the complementary reactive functional groups or autoreactive functional groups—that is, groups which react with groups of the same kind—are already present in the binder molecules, the binders present are self-crosslinking. It is also possible for a binder to have both self-crosslinking and externally crosslinking functional groups, and in that case it is combined with crosslinking agents. Examples of suitable complementary reactive functional groups and autoreactive functional groups are known from German patent application DE 199 30 665 A1, page 7, line 28, to page 9, line 24.

In the context of the present invention, actinic radiation means electromagnetic radiation such as near-infrared (NIR) and UV radiation, more particularly UV radiation, and also particulate radiation such as electron beams. Curing by UV radiation is typically initiated by free-radical or cationic photoinitiators.

Where thermal curing and curing with actinic radiation are employed jointly, the term "dual cure" is also used. In the present invention, preferred aqueous pigmented basecoat materials are those which are curable thermally and/or both thermally and with actinic radiation, i.e., by means of "dual cure".

The first essential constituent of the pigmented aqueous basecoat material to be used in the context of the method of the invention is at least one polyurethane resin (A) as binder. The polyurethane resin (A) may be hydrophilically stabilized nonionically and/or ionically. In preferred embodiments of the present invention, the polyurethane resin (A) is hydrophilically stabilized ionically. With particular preference it is a polyurethane resin (A) grafted with olefinically unsaturated compounds. The polyurethane resin (A) is curable physically, thermally and/or both thermally and with actinic radiation. More particularly it is curable thermally and/or both thermally and with actinic radiation. With particular preference the polyurethane resin (A) comprises reactive functional groups by means of which external crosslinking is possible.

Suitable polyurethanes are known from, for example
European patent EP 0 521 928 B1, page 2, line 57 to page 8, line 16,
German patent application DE 199 48 004 A1, page 4, line 19, to page 13, line 48,
European patent application EP 0 228 003 A1, page 3, line 24, to page 5, line 40,
European patent application EP 0 634 431 A1, page 3, line 38, to page 8, line 9, or
international patent application WO 92/15405, page 2, line 35, to page 10, line 32.

For preparing the polyurethane resin (A) it is preferred to use aliphatic, cycloaliphatic, aliphatic-cycloaliphatic, aromatic, aliphatic-aromatic and/or cycloaliphatic-aromatic polyisocyanates which are known to the skilled person.

Used as alcohol component for preparing the polyurethane resins (A) are preferably the saturated and unsaturated polyols of relatively high molecular mass and of low molecular mass, and also, optionally, monoalcohols in minor amounts, that are known to the skilled person. Low molecular mass polyols used are, in particular, diols and, in minor amounts, triols, for introducing branching. Examples of suitable polyols of relatively high molecular mass are saturated or olefinically unsaturated polyester polyols and/or polyether polyols. As polyols of relatively high molecular mass, use is made in particular of polyester polyols, more particularly those having a number-average molecular weight of 400 to 5000 g/mol (measured by means of gel permeation chromatography against a polystyrene standard).

For the hydrophilic stabilization or for increasing the dispersibility in aqueous medium, the polyurethane resin (A) may contain certain ionic groups and/or groups which can be converted into ionic groups (potentially ionic groups). Polyurethane resins (A) of this kind are referred to in the context of the present invention as ionically hydrophilically stabilized polyurethane resins (A). Likewise present may be nonionic hydrophilically modifying groups. Preference, however, is given to the ionically hydrophilically stabilized polyurethanes (A). To be more precise, the modifying groups are alternatively functional groups which can be converted by neutralizing agents and/or quaternizing agents into cations, and/or cationic groups (cationic modification)

or functional groups which can be converted by neutralizing agents into anions, and/or anionic groups (anionic modification)

and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted by neutralizing agents and/or quaternizing agents into cationic groups). Mention may additionally be made of the cationic groups prepared from the aforementioned functional groups using neutralizing agents and/or quaternizing agents known to the skilled person, such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are known to include, for example, carboxylic, sulfonic and/or phosphonic acid groups, more particularly carboxylic acid groups (functional groups which can be converted by neutralizing agents into anionic groups), and also anionic groups that are prepared from the aforementioned functional groups using neutralizing agents known to the skilled person, such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications may be introduced into the polyurethane resin (A) by monomers which contain the (potentially) ionic groups. The nonionic modifications are introduced, for example, through the incorporation of poly (ethylene) oxide polymers as lateral or terminal groups of the polyurethane molecules. The hydrophilic modifications are introduced, for example, via compounds which contain at least one group reactive toward isocyanate groups, preferably at least one hydroxyl group. For introducing the ionic modification it is possible to use monomers which as well as the modifying groups contain at least one hydroxyl group. For introducing the nonionic modifications it is preferred to use the alkoxypoly(oxyalkylene) alcohols and/or polyether diols that are known to the skilled person.

The polyurethane resin (A) is preferably a graft polymer. More particularly it is a polyurethane resin (A) grafted with olefinically unsaturated compounds, preferably olefinically unsaturated monomers. In this case, therefore, the polyurethane is grafted, for example, with side groups and/or side chains which are based on olefinically unsaturated monomers. More particularly the moieties in question are side chains based on poly(meth)acrylates. Poly(meth)acrylates for the purposes of the present invention are polymers or polymeric radicals which comprise acrylate and/or methacrylate group-containing monomers, preferably being composed of acrylate and/or methacrylate group-containing monomers. By side chains based on poly(meth)acrylates are meant side chains which are constructed in the course of the graft polymerization using (meth)acrylate group-containing monomers. In the graft polymerization here, preferably more than 50 mol %, more particularly more than 75 mol %, more particularly 100 mol %, based on the total amount of the monomers used in the graft polymerization, of (meth)acrylate group-containing monomers are used.

The side chains described are preferably introduced into the polymer after the preparation of a primary polyurethane resin dispersion. In this case, the polyurethane resin present in the primary dispersion may contain lateral and/or terminal olefinically unsaturated groups via which the graft polymerization with the olefinically unsaturated compounds then proceeds. The polyurethane resin for grafting, therefore, may be an unsaturated polyurethane resin (A). The graft polymerization then constitutes a free-radical polymerization of olefinically unsaturated reactants. It is also possible, for example, for the olefinically unsaturated compounds used for the graft polymerization to contain at least one hydroxyl group. In that case there may also initially be attachment of the olefinically unsaturated compounds via these hydroxyl groups by reaction with free isocyanate groups of the polyurethane resin. This attachment takes place instead of or in addition to the free-radical reaction of the olefinically unsaturated compounds with any present lateral and/or terminal olefinically unsaturated groups of the polyurethane resin. There then follows, again, the graft polymerization via free-radical polymerization as described earlier on above. At any rate, polyurethane resins (A) grafted with olefinically unsaturated compounds, preferably olefinically unsaturated monomers, are obtained.

As olefinically unsaturated compounds with which the polyurethane resin (A) is preferably grafted it is possible to use virtually all free-radically polymerizable, olefinically unsaturated, and organic monomers which are available for these purposes to the skilled person. A number of preferred monomer classes may be cited by way of example:

hydroxyalkyl esters of (meth)acrylic acid or of other alpha, beta-ethylenically unsaturated carboxylic acids, alkyl and/or cycloalkyl esters of (meth)acrylic acid having up to 20 carbon atoms in the alkyl radical, ethylenically unsaturated monomers containing at least one acid group, more particularly just one carboxyl group, such as (meth)acrylic acid, for example, vinyl esters of alpha-branched monocarboxylic acids having 5 to 18 carbon atoms, reaction products of (meth)acrylic acid with the glycidyl ester of an alpha-branched monocarboxylic acid having 5 to 18 carbon atoms, other ethylenically unsaturated monomers such as olefins (for example ethylene), (meth)acrylamides, vinylaromatic hydrocarbons (for example, styrene), vinyl compounds such as vinyl chloride and/or vinyl ethers, such as ethyl vinyl ether.

Preference is given to using monomers containing (meth) acrylate groups, and so the grafted-on side chains are poly (meth)acrylate-based side chains.

The lateral and/or terminal olefinically unsaturated groups in the polyurethane resin (A), via which the graft polymerization with the olefinically unsaturated compounds is able to proceed, are preferably introduced into the polyurethane resin via particular monomers. These particular monomers comprise not only an olefinically unsaturated group but also, for example, at least one group reactive toward isocyanate groups. Preference is given to hydroxyl groups and also primary and secondary amino groups. Hydroxyl groups are especially preferred.

Naturally, the monomers described through which the lateral and/or terminal olefinically unsaturated groups may be introduced into the polyurethane resin (A) may also be employed without the polyurethane resin (A) thereafter being additionally grafted with olefinically unsaturated compounds. It is preferred, however, for the polyurethane resin (A) to be grafted with olefinically unsaturated compounds.

The polyurethane resin (A) may be a self-crosslinking and/or externally crosslinking binder. The polyurethane resin (A) preferably comprises reactive functional groups through which external crosslinking is possible. In this case, the pigmented aqueous basecoat material preferably comprises at least one crosslinking agent as described later on below. More particularly, the reactive functional groups through which external crosslinking is possible are hydroxyl groups. For the purposes of the method of the invention it is possible with particular advantage to use polyhydroxy-functional polyurethane resins (A). This means that the polyurethane resin (A) contains on average more than one hydroxyl group per molecule.

The polyurethane resin (A) is prepared by the typical methods of polymer chemistry. This means, for example, the polymerization of polyisocyanates and polyols to polyurethanes, and the graft polymerization that preferably then follows with olefincially unsaturated compounds. These techniques are known to the skilled person and may be adapted individually. Exemplary preparation processes and reaction conditions are found in European patent EP 0 521 928 B1, page 2, line 57 to page 8, line 16.

If the pigmented basecoat material used is a self-crosslinking system, the amount of the polyurethane resin (A) is for example 50% to 90% by weight, preferably 50% to 80% by weight, and more preferably 50% to 70% by weight, based on the film-forming solids of the basecoat material.

In the case of externally crosslinking systems, the polyurethane resin content is, for example, between 10% and 80%, preferably between 15% and 75%, and more preferably between 20 and 70%, by weight, based in each case on the film-forming solids of the basecoat material.

By film-forming solids is meant the nonvolatile weight fraction of the basecoat material, excluding pigments and any fillers. The film-forming solids can be determined as follows: A sample of the pigmented aqueous basecoat material (approximately 1 g) is admixed with 50 to 100 times the amount of tetrahydrofuran and then stirred for about 10 minutes. The insoluble pigments and any fillers are then removed by filtration, and the residue is rinsed with a little THF, after which the THF is removed from the resultant filtrate on a rotary evaporator. The filtrate residue is dried at 120° C. for two hours and the film-forming solids that results in this drying operation is weighed.

The polyurethane resin (A) possesses preferably a number-average molecular weight of 200 to 30 000 g/mol, preferably of 2000 to 20 000 g/mol. It additionally possesses, for example, a hydroxyl number of 0 to 250 mg KOH/g, but more particularly of 20 to 150 mg KOH/g. The acid number of the polyurethane resin (A) is preferably 5 to 200 mg KOH/g, more particularly 10 to 40 mg KOH/g. The hydroxyl number is determined in accordance with DIN/ISO 4629, the acid number in accordance with DIN 53402.

It is essential to the invention that in the pigmented aqueous basecoat material, the polyurethane resin (A) is combined with an associative thickener (B), the associative thickener (B) being composed of at least one compound of the following formula (I):

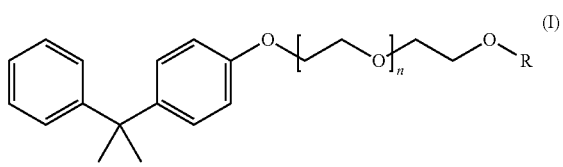

with n=0 to 50,
where R=

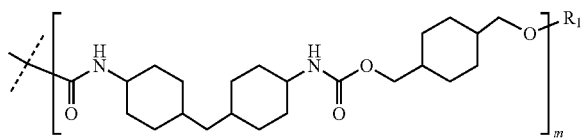

with m=0 to 10,
where $R_1$=H or $R_2$,
where $R_2$=

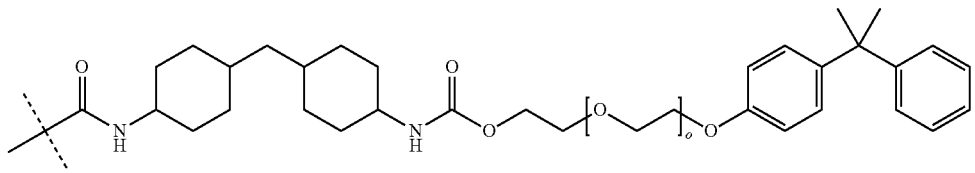

with o=0 to 50,
with the proviso that for not more than 50% by weight of the compounds of the formula (I), m=0 and $R_1$=H.

It is of advantage if m=0 and $R_1$=H for not more than 25%, more preferably not more than 10%, by weight of the compounds of the formula (I). In one particular embodiment of the present invention, m=0 and $R_1$=H does not apply to any compound of the formula (I). In other particular embodiments, the associative thickener is composed of compounds of the formula (I), for which $R_1$=$R_2$. In specific embodiments, the associative thickener is composed of compounds of the formula (I), for which m=1 to 10 and $R_1$=H. With preference the associative thickener (B) is composed of at least two compounds of the formula (I). In particular embodiments of the present invention the associative thickener is composed of at least two compounds of the formula (I) where $R_1$=$R_2$ for at least one compound (I) and m=1 to 10 and $R_1$=H for at least one other compound (I).

The at least one associative thickener (B) is used in a fraction of 0.05% to 10%, preferably 0.05% to 8%, with particular preference from 0.05% to 7%, and very preferably from 0.05% to 2%, by weight, based on the total weight of the pigmented aqueous basecoat material.

On account of its thickening properties and specific structure, the at least one associative thickener (B) is not suitable as a binder curable physically, thermally and/or both thermally and with actinic radiation. It is therefore explicitly different from the above-described polyurethane resin (A) which is used as binder.

The associative thickener (B) for combination with the polyurethane resin (A) in accordance with the invention is prepared by conventional techniques of organic synthetic chemistry.

Thus, for example, preparation may commence with an ethoxylation of the monoalcohol (1-methyl-1-phenylethyl) phenol. As the skilled person is aware, an ethoxylation of this kind is based, for example, on the alkalinically catalyzed addition reaction of ethylene oxide to the (deprotonated) monoalcohol, with a poly(oxyethylene) radical then being constructed by correspondingly alkalinically catalyzed polymerization of the ethylene oxide. The monoalcohols obtained are ethoxylated 4-(alpha,alpha-dimethylbenzyl)phenols.

In addition, for example, through the reaction of 1,4-cyclohexanedimethanol with methylenebis(4-cyclohexyl isocyanate), with formation of urethane bonds, polyurethane intermediates are obtained. The way in which polyurethane formation reactions of this kind are to be carried out is general knowledge. Reaction conditions such as, for example, the temperature or catalysts to be employed, and also their amounts, may be adapted by the skilled person without great cost or inconvenience. In this way, in a few goal-oriented experiments, it is possible to obtain intermediates which satisfy the conditions indicated in formula (I). The reference here in particular is to the number of monomer units of the diol and of the diisocyanate, expressed by the parameter m=1 to 10. By adapting the ratios of the diol and of the diisocyanate, it is possible to obtain adducts which comprise principally terminal isocyanate groups, principally terminal hydroxyl groups, or else the two possible end groups in approximately equimolar proportions.

This may then be followed by the reaction of the ethoxylated 4-(alpha,alpha-dimethylbenzyl)phenols with the polyurethane intermediates, producing the compounds of the formula (I) and hence also producing the associative thickener (B).

It is also possible for the ethoxylated 4-(alpha,alpha-dimethylbenzyl)phenols to be reacted directly in a one-pot reaction with 1,4-cyclohexanedimethanol and also with methylenebis(4-cyclohexyl isocyanate).

Examples of suitable organic solvents for the reactions are those which are capable of dissolving poly(oxyethylene)-containing compounds and, moreover, are inert toward a reaction with isocyanates. Examples are organic solvents which contain no functional groups with active hydrogen, such as benzene, toluene or xylene. Moreover, of course, as is known to the skilled person, operation ought to take place under anhydrous conditions and under an inert gas atmosphere. The reaction temperatures are situated within the ranges customary for such reactions, such as, for example, from about 25° C. to 160° C., more particularly from 40° C. to 120° C. As catalysts it is possible to use alkali metal hydroxides such as potassium hydroxide (for the ethoxylation) and also the systems known to the skilled person that are based on tertiary amines and/or organotin compounds, such as dibutyltin dilaurate, dioctyltin dilaurate or dioctyltin diacetate (for the polyurethane synthesis), for example.

An associative thickener (B) is obtainable, for example, as commercial product Adeka Nol UH 756-VF (from Adeka Corporation).

The pigmented basecoat material to be used in the context of the method of the invention is aqueous. Basecoat materials are said to be aqueous for the purposes of the present invention if they contain 20% to 70% by weight of water, based on the total weight of the pigmented aqueous basecoat material.

For the purposes of the present invention, the terms aqueous basecoat material and waterborne basecoat material are used synonymously.

The basecoat material used in accordance with the invention comprises at least one color and/or effect pigment. Color pigments and effect pigments of these kinds are known to the skilled person and are described in, for example, Römpp-Lexikon Lacke and Druckfarben, Georg Thieme Verlag, Stuttgart, New York, 1998, page 176 and 451. The fraction of the pigments may be situated, for example, in the range from 1% to 40%, preferably 2% to 20%, more preferably 5% to 15%, by weight, based on the total weight of the pigmented aqueous basecoat material.

The pigmented aqueous basecoat material to be used in the context of the method of the invention preferably further comprises at least one amino resin and/or at least one blocked and/or free polyisocyanate as crosslinking agent. Present more particularly are amino resins, with melamine resins being preferred.

The pigmented aqueous basecoat material may also, furthermore, comprise at least one additive. Examples of such additives are salts which can be decomposed thermally without residue or substantially without residue, resins which are curable physically, thermally and/or with actinic radiation and are different from polyurethane resins, as binders, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, free radical polymerization initiators, adhesion promoters, flow control agents, film-forming assistants, further thickeners other than associative thickener (B), sag control agents (SCAs), flame retardants, corrosion inhibitors, waxes, biocides, and matting agents.

The solids content of the basecoat material used in accordance with the invention may vary according to the requirements of the individual case. First and foremost the solids content is guided by the viscosity that is required for application, more particularly spray application, and so it may be set by the skilled person on the basis of his or her general art knowledge, with the assistance where appropriate of a few rangefinding tests.

The solids content of the pigmented aqueous basecoat material is preferably 5% to 70%, more preferably 10% to 65%, and with particular preference 15% to 60%, by weight.

By solids content is meant that weight fraction which remains as a residue when evaporated under defined conditions. In the present specification, the solids has been determined in accordance with DIN EN ISO 3251. The drying time was 60 minutes at 125° C.

The basecoat material used in accordance with the invention can be prepared using the mixing methods and mixing assemblies that are customary and known for producing basecoat materials.

The pigmented aqueous basecoat material used in accordance with the invention may be employed as a one-component (1K), two-component (2K) or multicomponent (3K, 4K) system. Preference is given to (1K) systems.

In one-component (1K) systems, for example, the polyurethane resin (A) is the binder and a crosslinking agent as described above is present alongside it, in other words in one component. A prerequisite for this is that the two constituents crosslink with one another only at relatively high temperatures and/or on exposure to actinic radiation.

In two-component (2K) systems, for example, the polyurethane resin (A) and a crosslinking agent as described above are present separately from one another in at least two components, which are not combined until shortly before application. This form is selected when the two constituents react with one another even at room temperature. Coating materials of this kind are employed in particular for coating thermally sensitive substrates, especially in automotive refinish.

The application of the pigmented aqueous basecoat material used in accordance with the invention to a substrate may take place in the film thicknesses that are customary in the context of the automobile industry, in the range from, for example, 5 to 100 micrometers, preferably 5 to 60 micrometers. This is done employing, for example, the known techniques such as spraying, knife coating, brushing, pouring, dipping, impregnating, trickling or rolling. Preference is given to employing spray application methods, such as, for example, compressed air spraying, airless spraying, high speed rotation, or electrostatic spray application (ESTA), alone or in conjunction with hot spray application such as hot air spraying, for example.

After the pigmented aqueous basecoat material has been applied, it may be dried by known techniques. For example, 1K basecoat materials may be flashed at room temperature for 1 to 60 minutes and subsequently dried preferably at optionally slightly elevated temperatures of 30 to 80° C. Flashing and drying for the purposes of the present invention mean the evaporation of organic solvents and/or water, whereby the coating material becomes drier, but is not yet cured, or there is as yet no formation of a fully crosslinked coating film.

A commercially customary clearcoat material is then applied likewise by common techniques, the film thicknesses again being situated within the customary ranges, such as 5 to 100 micrometers, for example. Clearcoat materials of this kind are known to the skilled person.

Following the application of the clearcoat material, it may be flashed at room temperature for 1 to 60 minutes, for example, and optionally dried. The clearcoat material is then cured together with the pigmented basecoat material applied. Here, for example, crosslinking reactions take place, to produce a multicoat color and/or effect paint system of the invention on a substrate. Curing takes place preferably thermally and/or both thermally and with actinic radiation, at temperatures from 80 to 200° C.

With the aid of the method of the invention it is possible with preference to coat metallic and also nonmetallic substrates, examples being plastics substrates. As substrates it is preferred to coat vehicle bodies and parts thereof, more particularly automobile bodies or parts thereof.

The invention is elucidated below with reference to examples.

EXAMPLES

1.) Preparation of White Pigmented Aqueous Basecoat Materials

The components listed in Table 1 are stirred together in the order stated to form aqueous mixtures. These mixtures are then stirred for 10 minutes and adjusted using dimethylethanolamine to a pH of 8.0, then adjusted using deionized water to a spray viscosity of approximately 58 mPas under a shearing load of 1000/s, measured using a rotational viscometer (Rheomat RM 180 instrument from Mettler-Toledo) at 23° C. Setting the pH and the spray viscosity of the waterborne basecoat materials 1 and 2 requires a total amount (dimethylethanolamine and water) of not more than 10 parts by weight.

TABLE 1

| Component | 1<br>Parts by<br>weight | 2<br>(comparative)<br>Parts by<br>weight |
|---|---|---|
| Polyurethane acrylate, prepared as per Example A of EP-B-521928 | 13 | 13 |
| Deionized water | 3 | 3 |
| Tensid S (surfactant: BASF) | 0.5 | 0.5 |
| White pigment paste, prepared as per Example 2.3 of DE-A-19705219 | 45 | 45 |
| Deionized water | 2 | 2 |
| Butylglycol | 3 | 3 |
| Luwipal 052 (melamine-formaldehyde resin, available from BASF) | 4.8 | 4.8 |
| Cymel 1133 (melamine-formaldehyde resin, available from Cytec) | 3.7 | 3.7 |
| Isopar L, solvent (available from Exxon Mobil) | 2 | 2 |
| Hydrosol A 170, solvent (available from DHC Solvent Chemie) | 1 | 1 |
| 30% strength by weight solution of EFKA-3772 (BASF), wetting agent | 1 | 1 |
| Deionized water | 20.3 | 20.3 |
| Rheological additive* | 0.68[1] | 0.5[2] |
| Deionized water | 5 | 5 |
| Yellow pigment paste, prepared as per Example 2.1 of DE-A-19705219 | 0.22 | 0.22 |
| Red pigment paste, prepared as per Example 2.1 of DE-A-19705219 | 0.02 | 0.02 |
| Black pigment paste, prepared as per Example 2.1 of DE-A-19705219 | 0.1 | 0.1 |
| Sum total | 105.32 | 105.14 |

[1]Associative thickener (B) for inventive use (31% strength by weight solution in water).
[2]Conventionally employed associative thickener based on polyurethane (40% strength by weight solution in water/butoxydiglycol, DSX 1550 from Cognis).
*The solids fraction of both associative thickeners is approximately 0.2 part by weight.

2.) Production of Multicoat Color Paint System, and Testing for Runs

To determine the run stability, waterborne basecoat materials 1 and 2, and a multicoat color paint system produced using these waterborne basecoat materials, were subjected to a run test. This test was carried out as follows:

A perforated metal panel with dimensions of 30×50 cm, coated with a primer-surfacer coat, was given an adhesive strip in order to allow the differences in coat thickness to be determined after coating. The respective pigmented waterborne basecoat material was applied electrostatically in wedge format. The resulting waterborne basecoat film was dried for 1 minute at room temperature and then for 10 minutes in a forced air oven at 70° C., the panel being stood vertically in the oven. A customary two-component clearcoat material was applied to the dry waterborne basecoat film. The resulting clearcoat film was flashed at room temperature for 20 minutes. The waterborne basecoat film and the clearcoat film were then cured in a forced air oven at 140° C. for 20 minutes, the panel being stood vertically in the oven. In this way, multicoat color paint systems were produced. Following visual evaluation of the run limit in the wedge-shaped multilayer paint system, the film thickness of the run limit was ascertained. The results are found in Table 2.

TABLE 2

| Waterborne basecoat material | Run limit in micrometers |
|---|---|
| 1 | 47 |
| 2 (comparative) | 23 |

The data in Table 2 demonstrate that a significantly improved run stability is obtained through the use of the associative thickeners (B) in comparison to conventionally employed associative thickeners based on polyurethane. The run limit of multicoat color paint systems produced by the method of the invention is more than twice as high as in the conventional multicoat coating.

The improved run propensity was also evident, furthermore, from the values of the oscillating viscosity determination.

For this purpose, the waterborne basecoat materials as per Table 1, after the setting of a pH of 8.0 and of the spray viscosity indicated above, were subjected to a measurement of rheology using a rheometer (Haake Rheostress 600 instrument) at 23° C. For this purpose, 0.5 ml of the waterborne basecoat materials were supplied to the measuring plate of the instrument, and first subjected to preliminary shearing under a shearing load of 1000/s for 5 minutes. The shearing is then reduced to 1/s and the profile of the sol curve against time is measured. Important characteristics here are the 1-minute value and the 8-minute value. The instrument is the Rheomat RM 180 from Mettler-Toledo.

Table 3 reports the values for the corresponding measurements.

TABLE 3

| Waterborne basecoat material | 1-Minute value in mPas | 8-Minute value in mPas |
|---|---|---|
| 1 | 1261 | 1273 |
| 2 (comparative) | 360 | 375 |

The data in Table 3 demonstrate that a high low-shear viscosity and, in correlation therewith, an outstanding run limit result through the combination of a polyurethane resin (A) with the associative thickener (B). The properties, moreover, are significantly better than when using conventionally employed associative thickeners based on polyurethane. The combination of polyurethane resins (A) and associative thickeners (B) in the pigmented waterborne basecoat material results in massively improved properties in the resultant multicoat paint systems.

The invention claimed is:

1. A method for producing a multicoat color and/or effect paint system comprising
   (1) applying to a substrate a pigmented aqueous basecoat material comprising at least one polyurethane resin (A) as binder and at least one color and/or effect pigment,
   (2) forming a polymer film from the basecoat material applied in stage (1) to produce a basecoat film,
   (3) applying a clearcoat material to the basecoat film, and then
   (4) curing the basecoat film together with the clearcoat material applied in stage (3), wherein the pigmented aqueous basecoat material applied in stage (1) comprises 0.05% to 10% by weight, based on the total amount of the pigmented aqueous basecoat material, of an associative thickener (B) different from the polyurethane resin (A), the associative thickener (B) being composed of at least one compound of the following formula (I):

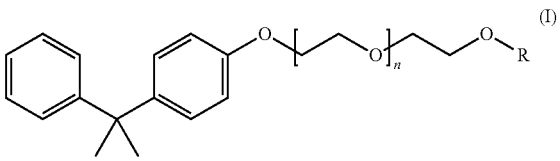

with n=0 to 50,
where R=

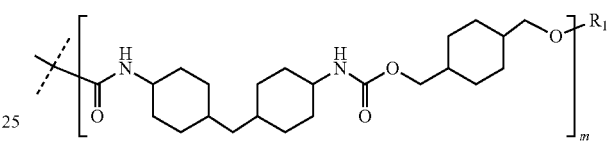

with m=0 to 10,
where $R_1$=H or $R_2$,
where $R_2$=

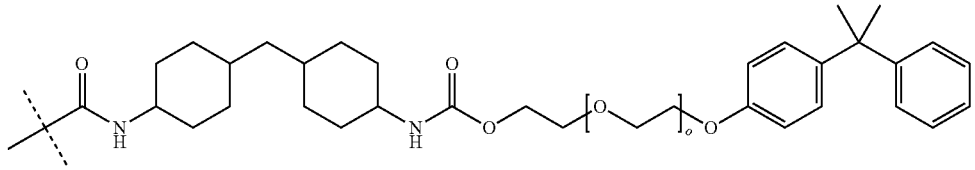

with o=0 to 50,
with the proviso that for not more than 50% by weight of the compounds of the formula (I), m=0 and $R_1$=H.

2. The method of claim 1, wherein the pigmented aqueous basecoat material used in stage (1) comprises 0.05 to 7% by weight, based on the total amount of the pigmented aqueous basecoat material, of an associative thickener (B).

3. The method of claim 2, wherein the pigmented aqueous basecoat material used in stage (1) comprises 0.05 to 2% by weight, based on the total amount of the pigmented aqueous basecoat material, of an associative thickener (B).

4. The method of claim 1, wherein for not more than 25% by weight of the compounds of the formula (I), m=0 and $R_1$=H.

5. The method of claim 1, wherein the associative thickener (B) comprises at least two compounds of the formula (I).

6. The method of claim 5, wherein for at least one compound (I), $R_1$=$R_2$ and, and for at least one further compound (I), m=1 to 10 and $R_1$=H.

7. The method of claim 1, wherein the polyurethane resin (A) is a polyhydroxy-functional polyurethane resin.

8. The method of claim 1, wherein the polyurethane resin (A) is prepared using monomers which contain an olefinically unsaturated group and also at least one group reactive toward isocyanate groups.

9. The method of claim 1, wherein the polyurethane resin (A) is a polyurethane resin grafted with olefinically unsaturated compounds.

10. The method claim 9, wherein the polyurethane resin (A) is grafted with olefinically unsaturated monomers, the graft polymerization being carried out using more than 50 mol %, based on the total amount of the monomers used in the graft polymerization, of (meth)acrylate-containing monomers.

11. The method of claim 1, wherein the pigmented aqueous basecoat material used in stage (1) comprises at least one amino resin as crosslinking agent.

12. The method of claim 1, wherein the pigmented aqueous basecoat material used in stage (1) is curable thermally and/or both thermally and with actinic radiation.

13. The method of claim 1, wherein the substrate is a vehicle body or part of a vehicle body.

14. A multicoat color and/or effect paint system on a substrate, which is made by the method of claim 1.

15. A pigmented aqueous basecoat material comprising at least one polyurethane resin (A) as binder, at least one color and/or effect pigment, and 0.05% to 10% by weight, based on the total amount of the pigmented aqueous basecoat material, of an associative thickener (B) different from the polyurethane resin (A), the associative thickener (B) comprising at least one compound of the following formula (I):

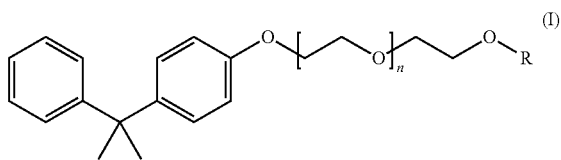

with n=0 to 50,
where R=

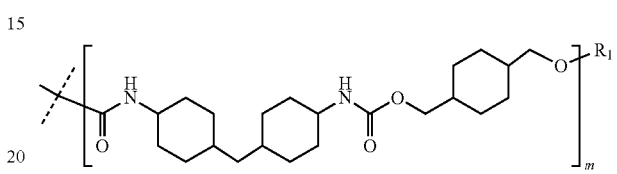

with m=0 to 10,
where $R_1$=H or $R_2$,
where $R_2$=

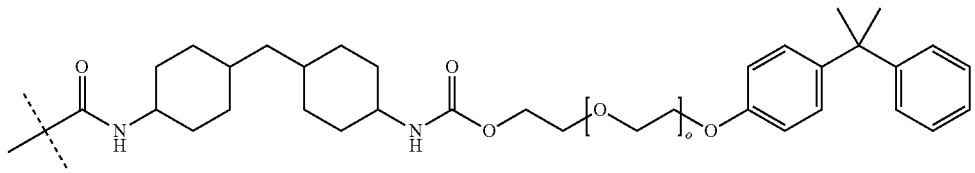

with o=0 to 50,
with the proviso that for not more than 50% by weight of the compounds of the formula (I), m=0 and $R_1$=H.

* * * * *